United States Patent
Keljo (10) Patent No.: US 8,499,236 B1
(45) Date of Patent: Jul. 30, 2013

(54) SYSTEMS AND METHODS FOR PRESENTING REFLOWABLE CONTENT ON A DISPLAY

(75) Inventor: Jonathan W. Keljo, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 557 days.

(21) Appl. No.: 12/691,625

(22) Filed: Jan. 21, 2010

(51) Int. Cl.
*G09G 5/00* (2006.01)

(52) U.S. Cl.
USPC .......... 715/249; 715/243; 715/244; 715/251; 715/252

(58) Field of Classification Search
USPC ............... 715/200, 243, 244, 249, 251, 252, 715/273
See application file for complete search history.

(56) References Cited

U.S. PATENT DOCUMENTS

| | | | |
|---|---|---|---|
| 4,741,045 A | 4/1988 | Denning | |
| 4,754,489 A | 6/1988 | Bokser | |
| 5,029,107 A | 7/1991 | Lee | |
| 5,285,526 A | 2/1994 | Bennett et al. | |
| 5,465,304 A | 11/1995 | Cullen et al. | |
| 5,590,257 A | 12/1996 | Forcier | |
| 5,671,438 A | 9/1997 | Capps et al. | |
| 5,774,580 A | 6/1998 | Saitoh | |
| 5,778,103 A | 7/1998 | Allan et al. | |
| 5,784,487 A | 7/1998 | Cooperman | |
| 5,802,533 A | 9/1998 | Walker | |
| 5,850,490 A | 12/1998 | Johnson | |
| 5,860,074 A | 1/1999 | Rowe et al. | |
| 5,907,631 A | 5/1999 | Saitoh | |
| 5,978,819 A | 11/1999 | Berstis | |
| 6,002,798 A | 12/1999 | Palmer et al. | |
| 6,032,163 A | 2/2000 | Tou et al. | |
| 6,256,610 B1 | 7/2001 | Baum | |

(Continued)

FOREIGN PATENT DOCUMENTS

| | | |
|---|---|---|
| EP | 1343095 A2 | 9/2003 |
| JP | 07-192084 A | 7/1995 |

(Continued)

OTHER PUBLICATIONS

Lin, X., Header and Footer Extraction by Page-Association, Hewlett-Packard Company, May 6, 2002, pp. 1-8, Palo Alto, California, U.S.

(Continued)

*Primary Examiner* — Stephen Hong
*Assistant Examiner* — Gregory J Vaughn
(74) *Attorney, Agent, or Firm* — Knobbe, Martens, Olson & Bear LLP (57) ABSTRACT

Systems and methods are provided for presenting reflow objects of content on an output medium. In some embodiments, the content to be presented may be determined by rendering one or more reflow objects of content to an image file, the image file having a horizontal dimension that approximates the horizontal dimension of the output medium and a vertical dimension that exceeds the vertical dimension of the output medium, and causing a portion of the image file to be presented on the output medium, wherein the portion of the image file presented corresponds to a view window logically superimposed upon the image file. A request for content that is not within the view window may be received, the location of the view window may be adjusted based on the request, and the adjustment may result in changing the portion of the image file presented on the display.

19 Claims, 5 Drawing Sheets

U.S. PATENT DOCUMENTS

| | | | |
|---|---|---|---|
| 6,269,188 B1 | 7/2001 | Jamali | |
| 6,298,357 B1 | 10/2001 | Wexler et al. | |
| 6,377,704 B1 | 4/2002 | Cooperman | |
| 6,487,570 B1 | 11/2002 | Forcier | |
| 6,510,243 B1 | 1/2003 | Ikeda | |
| 6,562,077 B2 | 5/2003 | Bobrow et al. | |
| 6,766,495 B1 | 7/2004 | Bates et al. | |
| 6,915,484 B1 | 7/2005 | Ayers et al. | |
| 6,956,587 B1 | 10/2005 | Anson | |
| 6,978,046 B2 | 12/2005 | Robinson et al. | |
| 7,171,061 B2 | 1/2007 | Sarkar et al. | |
| 7,213,035 B2 | 5/2007 | Ornstein et al. | |
| 7,219,309 B2 | 5/2007 | Kaasila et al. | |
| 7,272,258 B2 | 9/2007 | Berkner et al. | |
| 7,280,702 B2 * | 10/2007 | Chang et al. | 382/240 |
| 7,362,311 B2 | 4/2008 | Filner et al. | |
| 7,392,472 B2 | 6/2008 | Simard et al. | |
| 7,412,647 B2 | 8/2008 | Sellers et al. | |
| 7,433,548 B2 | 10/2008 | Goodwin et al. | |
| 7,460,710 B2 | 12/2008 | Coath et al. | |
| 7,469,388 B1 | 12/2008 | Baudisch et al. | |
| 7,486,628 B1 | 2/2009 | Brisebois et al. | |
| 7,536,446 B2 * | 5/2009 | Blumberg | 709/217 |
| 7,715,635 B1 | 5/2010 | Shagam et al. | |
| 7,737,993 B2 * | 6/2010 | Kaasila et al. | 345/613 |
| 7,780,088 B2 * | 8/2010 | Vinogradov | 235/462.42 |
| 7,810,026 B1 | 10/2010 | Shagam et al. | |
| 7,818,041 B2 * | 10/2010 | Kim et al. | 600/407 |
| 7,870,503 B1 | 1/2011 | Levy et al. | |
| 7,893,984 B2 * | 2/2011 | Ikeda | 348/333.12 |
| 7,899,249 B2 | 3/2011 | Furmaniak et al. | |
| 7,961,987 B2 | 6/2011 | Goodwin et al. | |
| 7,970,647 B2 * | 6/2011 | Koeppel et al. | 705/14.1 |
| 8,023,738 B1 | 9/2011 | Goodwin et al. | |
| 8,413,048 B1 | 4/2013 | Goodwin et al. | |
| 2002/0052898 A1 | 5/2002 | Schlit et al. | |
| 2002/0191847 A1 | 12/2002 | Newman et al. | |
| 2003/0014445 A1 | 1/2003 | Formanek et al. | |
| 2003/0126558 A1 | 7/2003 | Griffin | |
| 2003/0128234 A1 | 7/2003 | Brown et al. | |
| 2003/0135649 A1 | 7/2003 | Buckley et al. | |
| 2003/0231219 A1 | 12/2003 | Leung | |
| 2004/0004641 A1 | 1/2004 | Gargi | |
| 2004/0103371 A1 | 5/2004 | Chen et al. | |
| 2004/0114814 A1 | 6/2004 | Boliek et al. | |
| 2004/0139384 A1 | 7/2004 | Lin | |
| 2004/0146199 A1 | 7/2004 | Berkner et al. | |
| 2004/0183817 A1 * | 9/2004 | Kaasila | 345/660 |
| 2004/0202352 A1 | 10/2004 | Jones | |
| 2004/0205568 A1 * | 10/2004 | Breuel et al. | 715/513 |
| 2005/0062758 A1 * | 3/2005 | Kaasila et al. | 345/613 |
| 2005/0125549 A1 | 6/2005 | Katayama | |
| 2005/0128516 A1 | 6/2005 | Tomita | |
| 2005/0234893 A1 | 10/2005 | Hirsch | |
| 2006/0005116 A1 | 1/2006 | Ferguson et al. | |
| 2006/0181742 A1 | 8/2006 | Lech et al. | |
| 2006/0227153 A1 | 10/2006 | Anwar et al. | |
| 2006/0282838 A1 | 12/2006 | Gupta et al. | |
| 2006/0288278 A1 | 12/2006 | Kobayashi | |
| 2006/0288279 A1 | 12/2006 | Yacoub et al. | |
| 2007/0061704 A1 | 3/2007 | Simova et al. | |
| 2007/0112810 A1 | 5/2007 | Johnson | |
| 2007/0234203 A1 | 10/2007 | Shagam et al. | |
| 2008/0267535 A1 | 10/2008 | Goodwin et al. | |
| 2011/0016384 A1 | 1/2011 | Shagam et al. | |

FOREIGN PATENT DOCUMENTS

| | | |
|---|---|---|
| JP | 2004005453 A | 1/2004 |
| JP | 2004532430 T | 10/2004 |
| WO | WO 02/089105 A2 | 11/2002 |

OTHER PUBLICATIONS

Montanés, E., et al., Towards Automatic and Optimal Filtering Levels for Feature Selection in Text Categorization, Advances in Intelligent Data Analysis VI, Sep. 2005, pp. 239-248.

PDF Reference Fifth Edition, Adobe Portable Document Format Version 1.6, Chapter 5.9, Adobe Systems Incorporated, 1985-2004, pp. 440-446.

Taghva et al., The Impact of Running Headers and Footers on Proximity Searching, Information Science Research Institute, University of Nevada, 2004, pp. 5, Las Vegas, Nevada, U.S.

Breuel, T.M., et al., Reflowable Document Image, Chapter 1, pp. 1-14, <http://citeseerx.ist.psu.edu/viewdoc/download?doi=10.1.1.12.9828&rep=rep1&type=pdf> [retrieved on Nov. 17, 2010], Nov. 18, 2002.

Boychuk, Ben, "Shortcovers for iPhone Review", http://www.macworld.com/article/141540/2009/07/shortcovers.html, Macworld.com, Jul. 6, 2009, 3 pages.

Malerba, et al., "Correcting the Document Layout: A Machine Learning Approach", Proceedings of the Seventh International Conference on Document Analysis and Recognition (ICDAR 2003) IEEEE 2003, 6 pages.

* cited by examiner

SYSTEMS AND METHODS FOR PRESENTING REFLOWABLE CONTENT ON A DISPLAY

BACKGROUND

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print, as well as electronic media in which the aforesaid content exists in digital form or is transformed from print into digital form through the use of a scanning device. The Internet, in particular, has facilitated the wider publication of digital content through downloading and display of images of content. As data transmission speeds increase, more and more page images of content are becoming available online. A page image allows a reader to see the page of content as it would appear in print.

Some readers, however, may have computing devices with displays which are sized differently from the display for which a page image is originally formatted. Also, some readers may wish to view the text in a page image in a varyingly-sized window within a display. A content provider may generate and maintain different versions of the same content to accommodate various sized displays. However, this approach can be inefficient and costly. Alternatively, a reflowable file may be generated which can be rendered on displays or windows of various sizes by reflowing the content of the reflowable file to fit the display. However, rendering or reflowing a portion of the reflowable file to fit a given display typically does not allow for a user to scroll through the rendered content a partial screen at a time, such as progressing forwards or backwards in the content line by line. Instead, a user must often view one screen or page of reflowed content at a time, or otherwise be limited in the user's ability to continuously scroll through the content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to causing the content of a reflowable file to be presented on a display. In certain embodiments, the reflowable file may be presented in a manner such that a user may scroll through the presented content a screen or page at a time, a line of "reflowable" or "reflow" objects at a time, or a line of pixels at a time. In some embodiments, such scrolling is permitted by drawing or rendering reflow objects to an image file or "virtual buffer" that has approximately the same horizontal dimension as the horizontal dimension of the display, but has a substantially larger vertical dimension than the vertical dimension of the display. While the "virtual buffer" is referred to herein as an "image file," the virtual buffer may in fact comprise multiple image files that may effectively be treated as a single larger image by assigning an order to the image files and allowing for seamless display of portions of multiple images (e.g., by merging image data from the bottom portion of one image file and the top portion of the next image file). A view window having the approximate vertical and horizontal dimensions of the display may be logically superimposed upon a portion of the rendered image file, and the portion of the image file within the view window may be presented on the display. After initial display of a portion of the content in the image file, a scroll indication requesting the display of additional content of the reflowable file may be received from the user. In response, the location of the view window logically superimposed upon the image file may be adjusted, such as by changing the vertical positioning of the view window up or down with respect to the image file according to the scroll indication. If the image file contains sufficient reflow object data within the view window, the portion of the image file within the view window may be presented on the display. If instead the image file does not contain sufficient reflow object data within the view window, additional reflow objects may be rendered to the image file prior to the portion of the image file within the view window being presented on the display.

A reflowable file may be a file configured for rendering on various sized displays or windows. In one embodiment, the reflowable file includes one or more reflow objects that may be "reflowed" for presentation on a given sized window or display. As used herein, "reflow" of content refers to changing the line segmentation of reflow objects of content. In the context of the present disclosure, the term "reflow objects" includes a selection of one or more letters, characters, symbols, numbers, formulas, graphics, line drawings, table borders, textual content, etc., that may be used to represent information in an image. In certain embodiments, identifiable content, such as a word, can be represented as a single reflow object. Alternatively, identifiable content can also be represented as a number of reflow objects.

Reflow objects of content may be represented in the reflowable file in a variety of forms. For example, in some embodiments, the reflowable file may be an image-based reflowable file in which a reflow object forms a sub-image within an image of content, the sub-image being defined by a bounding region. An approach to creating and rendering image-based reflowable files is set forth in co-pending and commonly owned U.S. patent application Ser. No. 11/392,248, entitled "Generating Image-Based Reflowable Files for Rendering on Various Sized Displays," and filed Mar. 29, 2006, the entirety of which is incorporated herein by reference. In other embodiments, the reflowable file may be a token-based reflowable file in which a reflow object may comprise one or more tokens that each represent a shape or curve. A reflow object in a token-based reflowable file may comprise one or more vectorized tokens that each mathematically represent a shape in clean curves, such that the shapes may be rendered crisply even at high resolutions. An approach to converting pages of content to a token-based file for rendering is set forth in commonly owned U.S. Pat. No. 7,460,710, entitled "Converting Digital Images Containing Text to Token-Based Files for Rendering," and issued Dec. 2, 2008, the entirety of which is incorporated herein by reference. In other embodiments, the reflowable file may be a document in Portable Document Format ("PDF"), electronic publication ("EPUB") format, Open eBook publication format (e.g., the binary format known as the "Mobipocket" format produced by Mobipocket SA) or other reflowable publication file formats. For example, the reflowable file may include text along with markup information that describes the style and/or structure of the textual content.

Figure 1:
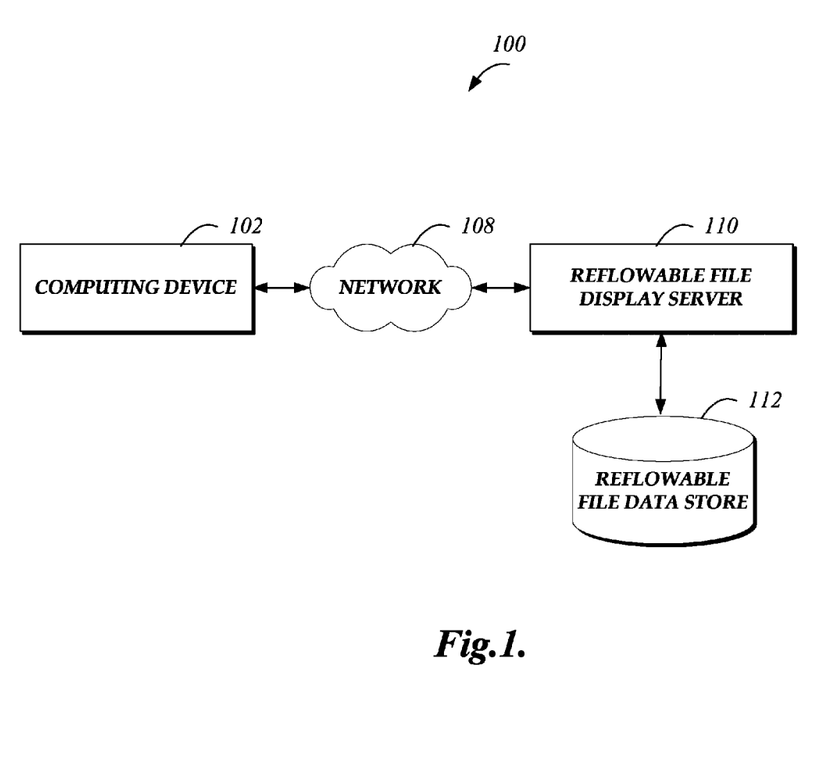
FIG. 1 is a block diagram depicting an illustrative operating environment in which content from a reflowable file is presented on a display of a computing device.

FIG. 1 depicts an illustrative operating environment in which content from a reflowable file is presented on a display of a computing device. The depicted environment includes a computing device 102 and a reflowable file display server 110 communicatively connected be a network 108, such as the Internet. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, and the like. In the illustrated embodiment, the computing device 102 may present for display image data received from the reflowable file display server 110 via the network 108. In an illustrative embodiment, a suitable viewer (e.g., a browser or electronic book reader) application operates on the computing device 102 to cause it to present the image data on a display or output medium.

As illustrated, the reflowable file display server 110 includes or communicates with a reflowable file data store 112. Those skilled in the art will appreciate that the reflowable file data store 112 may be local to the reflowable file display server 110, may be remote to the reflowable file display server 110, and/or may be a network-based service itself. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2:
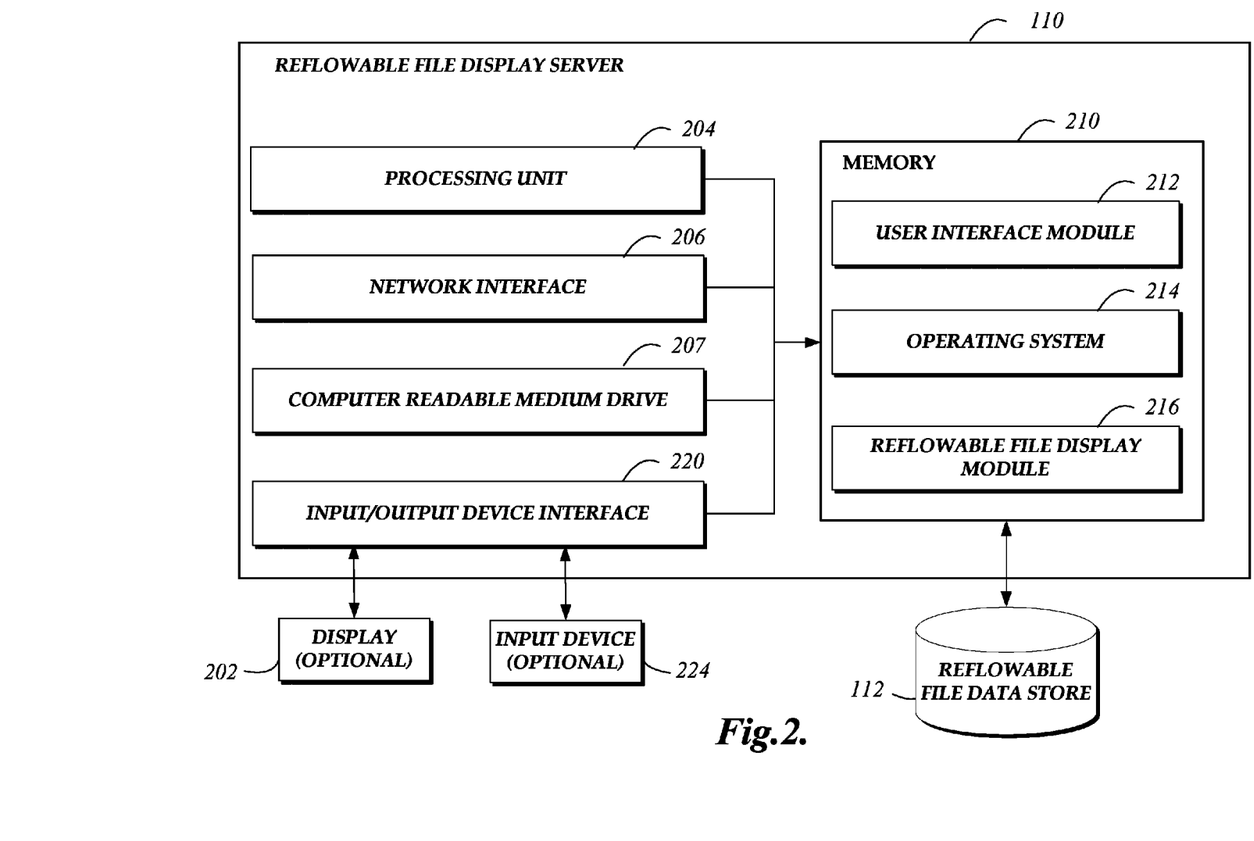
FIG. 2 depicts a general architecture of a reflowable file display server for causing content from a reflowable file to be displayed on an output medium.

FIG. 2 depicts a general architecture of a reflowable file display server 110 for causing content to be presented on a display. The general architecture of the reflowable file display server 110 depicted in FIG. 2 includes an arrangement of computer hardware and software components that may be used to implement aspects of the present disclosure. Those skilled in the art will appreciate that the reflowable file display server 110 may include many more (or fewer) components than those shown in FIG. 1. It is not necessary, however, that all of these generally conventional components be shown in order to provide an enabling disclosure. As illustrated in FIG. 1, the reflowable file display server 110 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network.

The processing unit 204 may also communicate to and from memory 210 and further provide output information for an optional display 202 via the input/output device interface 220. The input/output device interface 220 may also accept input from an optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent memory. The memory 210 may store an operating system 214 that provides computer program instructions for use by the processing unit 204 in the general administration and operation of the reflowable file display server 110. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with an auxiliary reflowable file data store 112. Data stored in the reflowable file data store 112 may include reflowable files of various types, including image-based reflowable files and/or token-based reflowable files, as discussed above.

In addition to the user interface module 212, the memory 210 may include a reflowable file display module 216 that may be executed by the processing unit 204. In one embodiment, the reflowable file display module 216 implements various aspects of the present disclosure, e.g., determining layout information, rendering reflow objects to an image file, adjusting the location of the view window with respect to the image file, etc., as described further below. While the reflowable display module 216 is shown in FIG. 2 as part of the reflowable file display server 110, in other embodiments, all or a portion of a reflowable file display module may be a part of the computing device 102. For example, in certain embodiments of the present disclosure, the computing device 102 may include several components that operate similarly to the components illustrated as part of the reflowable file display server 110, including a user interface module, reflowable file display module, processing unit, computer readable medium drive, etc. In such embodiments, the computing device 102 may communicate with a reflowable file data store, such as reflowable file data store 112, and the reflowable file display server 110 may not be needed to implement in certain embodiments.

Figure 3:
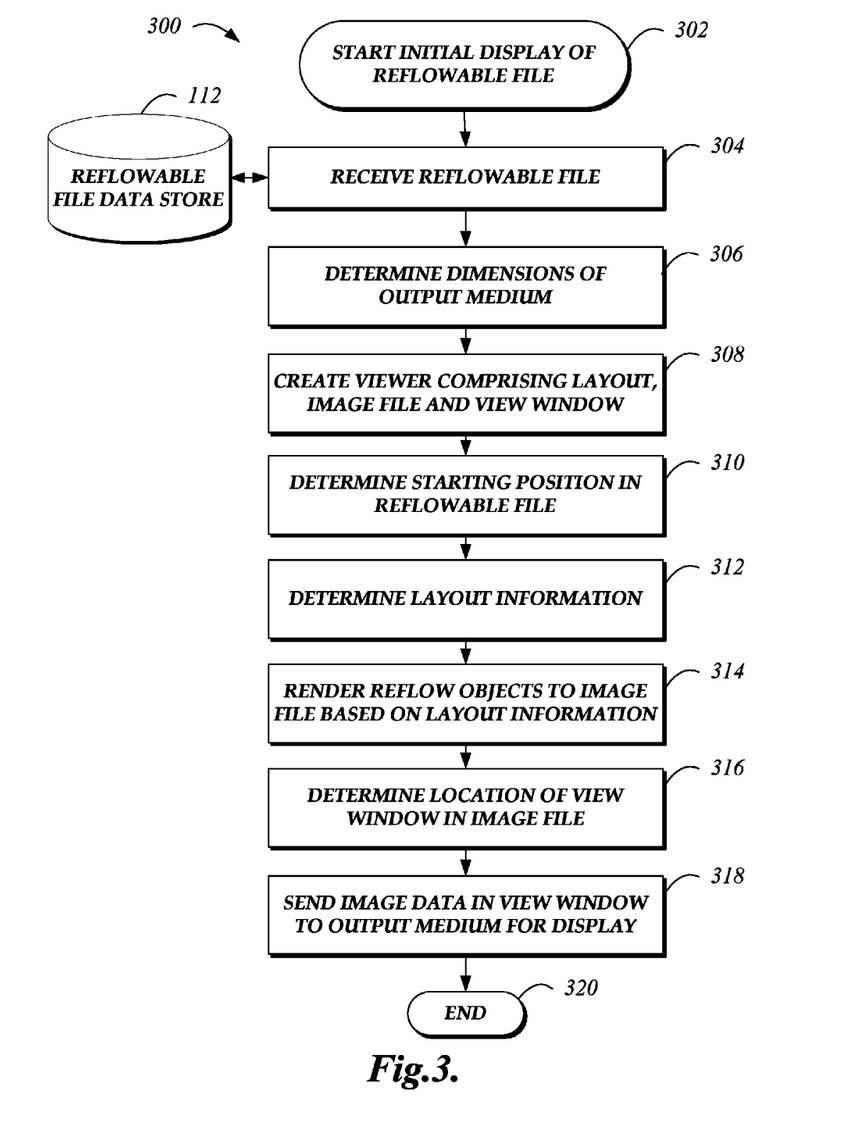
FIG. 3 is a flow diagram of an illustrative method implemented by a reflowable file display module for causing an initial display of content from a reflowable file.

FIG. 3 is a flow diagram of an illustrative method 300 implemented by the reflowable file display module to cause the initial display of content from a reflowable file. The method begins at block 302 and then proceeds to block 304, in which the reflowable file display module receives a reflowable file. In embodiments in which the reflowable file display module is implemented on reflowable file display server 110, the reflowable file may be retrieved from reflowable file data store 112. In embodiments in which the reflowable file display module is implemented on computing device 102, the reflowable file may be received by computing device 102 from reflowable file display server 110, or retrieved from a reflowable file data store similar to reflowable file data store 112 that is either local or remote to computing device 102. As discussed above, the reflowable file may contain reflow objects of content in a variety of forms. Generally, the reflowable file contains reflow objects of content, whether image-based, vector-based, or in some other form, which may be reflowed and rendered to an output medium. At block 306, the reflowable file display module determines the horizontal dimension and vertical dimension of the output medium upon which the content is to be presented. In certain embodiments, the determined horizontal dimension and vertical dimension of the output medium may refer to the dimensions of a portion of a display upon which the reflowable content is to be presented, such as the dimensions of a window within a display. In other embodiments, the horizontal dimension and vertical dimension of the output medium may refer to the physical dimensions of a display.

In certain embodiments, at block 308 the reflowable file display module creates a viewer comprising a layout, an image file, and a view window. Generally, the layout refers to a file or portion of memory which may be used to store data regarding the line segmentation of reflow objects to be rendered to the image file and/or the location in the image file at which to render one or more reflow objects. The layout is initially empty, meaning that it does not yet identify any reflow objects. The manner in which layout information is determined is discussed further below. At block 308, the created image file may be an initially empty or blank file or plurality of files that pixel or other image data may be written to, such as a bitmap, Tagged Image File Format ("TIFF"), etc. In some embodiments, the image file may simply be an in-memory collection of pixel data, rather than a specifically formatted file. In certain embodiments, the horizontal dimension of the image file approximates the horizontal dimension of the output medium, and the vertical dimension exceeds the vertical dimension of the output medium. In other embodiments, the horizontal dimension of the image file may be less than the horizontal dimension of the output medium. In certain embodiments, the dimensions of the image file are set such that the entire width of the image file is capable of being displayed pixel-for-pixel on the output medium, and a view window may be logically moved up and down the image file, as discussed further below. In other embodiments, the view window may be logically moved horizontally with respect to the image file.

The "view window" refers to information which may be used to identify a location or portion of the image file to present on the output medium. The view window may be thought of as being logically superimposed upon the image file. In some embodiments, both the horizontal and vertical dimensions of the view window are generally less than or equal to the corresponding dimensions of the output medium. While the view window is described herein as having dimensions, sufficient information for representing the view window, in some embodiments, may be a number corresponding to a vertical location in the image file. For example, in certain embodiments, the horizontal and vertical dimensions of the output medium determined at block 306 may be used as the dimensions of the view window. In this example, if the horizontal dimension of the image file is equal to the horizontal dimension of the output medium, the location and bounds of the view window relative to the image file may be determined entirely by a vertical location or position in the image file, such as the y-coordinate of the top left corner of the view window relative to the image file. In other embodiments, the horizontal and/or vertical dimensions of the view window may be set to be less than the corresponding dimensions of the output medium, and the information identifying the view window may include, for example, the horizontal and vertical dimensions of the view window and the x and y coordinates within the image file of the top left corner of the view window.

At block 310, the reflowable file display module determines the starting position in the reflowable file. In certain embodiments, the starting position may refer to a specific reflow object of content within the reflowable file. In other embodiments, the starting position may refer to a certain grouping of reflow objects, such as a paragraph or a chapter of a book, depending on the organization and format of the reflowable file. The default starting position may be the beginning of the reflowable file (e.g., the first reflow object stored in the reflowable file). Other starting positions may be determined, for example, based on a previous viewing of the content stored in the reflowable file. For example, if the content of the reflowable file corresponds to the content of a book, the starting position may be based on the last reflow object, paragraph, chapter, etc. of the reflowable file that was previously presented on the output medium.

The reflowable file display module determines layout information at block 312. While the determination of layout information is illustrated in FIG. 3 as distinct from actually rendering reflow objects to the image file, in some embodiments the reflow objects may actually be rendered to the image file as their layout information is determined. As discussed above, determining layout information may include determining the line segmentation of reflow objects to be rendered with respect to the image file and/or the location in the image file at which to render reflow objects. Various methods for determining the location and line segmentation of reflow objects for rendering are described in U.S. patent application Ser. No. 11/392,248, entitled "Generating Image-Based Reflowable Files for Rendering on Various Sized Displays," incorporated herein previously by reference. While that application discloses methods for rendering reflow objects to an output medium, the present disclosure describes rendering reflow objects to an image file which is of a greater vertical dimension than the vertical dimension of the output medium. Thus, the layout information determined in block 312 may include layout information for a greater number of reflow objects than that which would be displayed on the output medium.

In certain embodiments, determining layout information may include segmenting the reflow objects of content into lines. For example, the layout information may contain line data for a plurality of lines, with the line data for each line including identifiers identifying reflow objects in the reflowable file. For example, an abstract representation of the determined layout information may be "Line 1: object1, object2, object3; Line 2: object4, object5, object6, object7 . . . ," where "object1," "object2," etc., each represent an identifier identifying a specific reflow object of content within the reflowable file. In certain embodiments, the layout information may include coordinates in the image file at which to render one or more reflow objects. For example, each line may be associated with a vertical position or y-coordinate in the image file, and each reflow object associated with that line in the layout information may be associated with a horizontal position or x-coordinate in the image file. These coordinates may be used to determine a precise position in the image file at which to render each reflow object. In other embodiments, certain aspects of the spacing details regarding where in the image file to render each line of reflow objects, and where in the image file to render each reflow object associated with a given line, may be determined during the actual rendering of reflow objects to the image file at block 314. The layout information for a given line may be determined based at least in part on the number of reflow objects that fit horizontally on a line, given the dimensions of each reflow object. Various methods for determining the manner in which reflow objects are spaced both horizontally and vertically relative to each other are disclosed in U.S. patent application Ser. No. 11/392,248, previously incorporated herein by reference. For example, a vertical position within the image file for each horizontal line of reflow objects may be determined based on maintaining a certain minimum vertical spacing between lines. As one example, the vertical position of each reflow object associated with that line may then be determined such that a reflow object baseline associated with each reflow object in the reflowable file aligns with the vertical position determined for that line. Many spacing arrangements are possible, such as left, right, or full justification of each reflow object on a line, as discussed in more detail in U.S. patent application Ser. No. 11/392,248, previously incorporated herein by reference.

Though not shown in FIG. 3, in certain embodiments the reflowable file display module may receive or determine a display zoom level or resizing level prior to determining layout information. In such embodiments, the reflowable file display module may resize the reflow objects of content according to the display zoom level prior to determining layout information for the resized reflow objects. For example, as discussed further in U.S. patent application Ser. No. 11/392,248, referenced above, if a zoom up is requested, the size of the content that makes up a reflow object (for example, the image data within a bounding region associated with the reflow object in an image-based reflowable file) may be enlarged so that a smaller number of reflow objects fit on each line.

The amount of layout information determined at block 312 may vary between different embodiments. Generally, at a minimum, the initial amount of layout information includes sufficient layout information to fill the dimensions of the view window with reflow object data (e.g., pixel information resulting from rendering reflow objects to the image file, discussed below). The amount of reflow object data that fills the dimensions of the view window may be considered a "screen" of data, or a "page" of data. In certain embodiments, the initial layout information may include a certain amount of data before and after the starting point in the reflowable file. For example, given a certain location of the view window with respect to the image file, layout information may be determined for a preset number of lines, paragraphs, or pages of data after or below the location of the view window in the image file, and for a preset number of lines, paragraphs, or pages of data before or above the location of the view window in the image file. In some embodiments, the amount of layout information to determine before and/or after the starting position in the reflowable file may depend on previous user activity, such as the frequency with which a user moves backwards through content, the relative speed with which a user typically moves through content, etc.

In some embodiments, layout information may be determined for all reflow objects that are grouped together, such as words within a paragraph, whenever any portion of that grouping is included in the layout information. For example, if the starting position in the reflowable file determined at block 310 refers to a reflow object in the middle of a paragraph, the reflowable file display module may determine layout information for the entire paragraph and later adjust the view window to the appropriate line, as discussed below. In this example, in certain embodiments, the reflow object referred to as the starting position may not in fact be set as the first reflow object in a line when layout information is determined, as the spacing and locations of reflow objects in the layout information may be based on best presenting the start of the paragraph or other reflow object grouping with which that reflow object is associated in the reflowable file. For example, certain groupings, such as paragraphs, may need to be laid out in full in order to space the reflow objects therein such that the beginning of each paragraph appears in a uniform manner (e.g., each paragraph begins at a similar horizontal position in the image file, such that it appears indented relative to other lines). In other embodiments, the reflow object marked as the starting position may always be used as the start of a line when determining layout information, but the layout information for that grouping may need to be changed (reflowed) if a user requests to view previous reflow objects in that grouping, such as the start of the paragraph, as discussed further below.

At block 314, the reflowable file display module renders reflow objects to the image file based on the layout information determined at block 312. In general, rendering a reflow object to the image file involves writing image data corresponding to the reflow object into a portion or location of the image file, said portion or location based on the previously determined layout information. The method used to determine the image data (e.g., pixel data) corresponding to a reflow object may depend on the form or type of reflowable file. For example, as discussed above, the reflowable file may be an image-based reflowable file in which a reflow object forms a sub-image within an image of content, the sub-image being defined by a bounding region. An approach to rendering reflow objects in an image-based reflowable file in this form is disclosed in U.S. patent application Ser. No. 11/392,248, previously incorporated herein by reference. In other embodiments, the reflowable file may be a token-based reflowable file in which a reflow object may comprise one or more vectorized tokens that each mathematically represent a shape in clean curves, such that the shapes may be rendered crisply even at high resolutions. Such an approach is described in U.S. Pat. No. 7,460,710, previously incorporated herein by reference.

In some embodiments, at block 314, the reflowable file display module may render to the image file all reflow objects for which layout information was determined at block 312. In other embodiments, the reflowable file display module may only render a portion or subset of the reflow objects, or lines of reflow objects, for which layout information has been determined. For example, the storage of layout information may require substantially less memory than rendered image data corresponding to that layout information, such that the most efficient use of memory may be to determine a relatively large amount of layout data while only rendering a relatively small number of pages to the image file. Keeping excess layout information beyond what has actually been rendered to the image file may improve the ability to consistently present the reflow objects of content as a user moves through the content, as discussed below.

At block 316, the reflowable file display module determines the location of the view window relative to the image file. The location of the view window may be represented, for example, by x and y coordinates of the top left corner of the view window, or simply by y-coordinate if the view window is of the same horizontal dimension as the image file. The initial location of the view window generally has some relation to the location in the image file at which the reflow object used as a starting position in the reflowable file was rendered to the image file. For example, the location of the view window may be set such that the first line within the view window is the line in which the reflow object used as a starting position was rendered. Depending on the embodiment, this may or may not be the first line that was rendered to the image file. For example, in some embodiments, an entire paragraph containing the reflow object that was used as the starting position may have been rendered, in which case the reflowable file display module may consider the layout information in order to find the location in the image file at which the line containing the starting position was rendered. In other embodiments, the initial location of the view window may be set such that the first line within the view window corresponds to the beginning of the paragraph, chapter, or other reflow object grouping to which the reflow object used as a starting position is a part.

At block 318, the reflowable file display module sends image data in the view window to the output medium for display, or otherwise causes the portion of the image file within the view window to be presented on the output medium. Those skilled in the art will recognize that there are a variety of methods for displaying image data in an image file. In some embodiments, the reflowable file display module may cause a pixel-by-pixel copy of the image file data within the view window to be displayed. In other embodiments, the reflowable file display module may not cause the display of certain portions of the image file data within the view window, for example, it may not cause display of rendered reflow objects which are only partially within the view window. For example, the reflowable file display module may refer back to the layout information to determine whether there are any lines of reflow objects at the top or bottom of the view window which are rendered partially within and partially outside of the view window. In certain embodiments, the reflowable file display module may not cause display of these partial lines. In the illustrated embodiment, the method of causing the initial display of the reflowable file ends at block 320.

Figure 4:
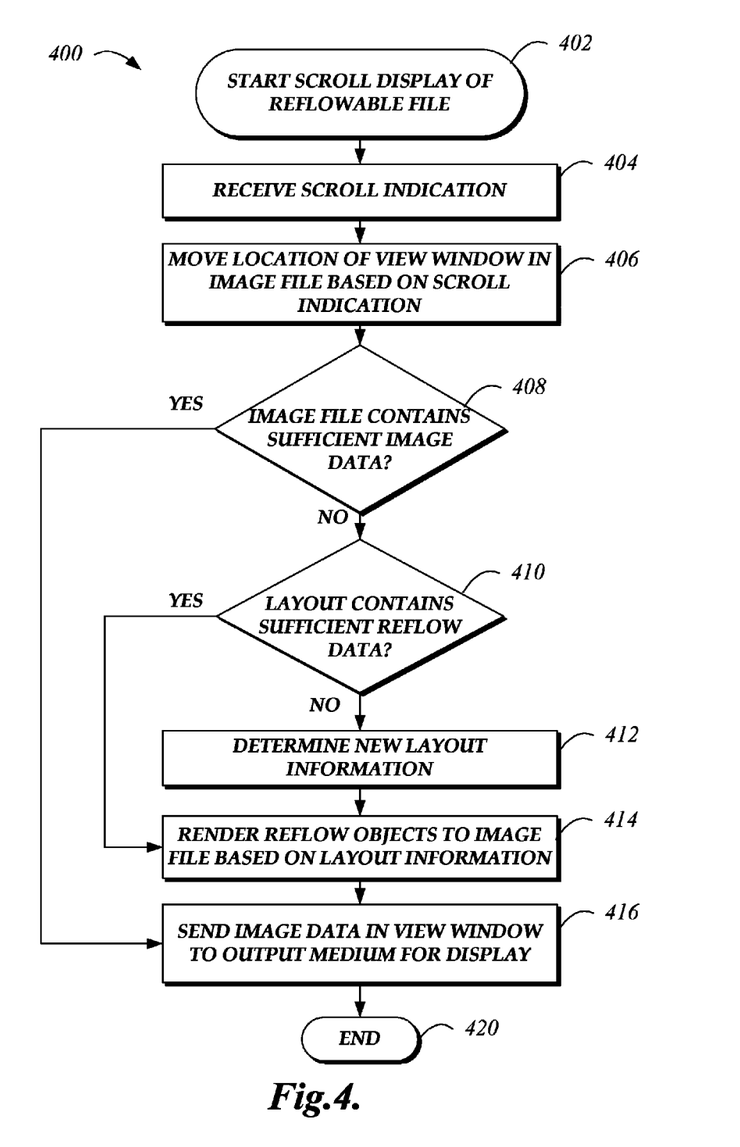
FIG. 4 is a flow diagram of an illustrative method implemented by the reflowable file display module for causing display of a reflowable file in response to a scroll indication received from a user.

FIG. 4 is a flow diagram of an illustrative method 400 implemented by the reflowable file display module for causing display of a reflowable file in response to a scroll indication received from a user. The method begins at block 402, after an initial display of the reflowable file, as discussed above in reference to FIG. 3, has already occurred. At block 404, the reflowable file display module receives a scroll indication. As used herein, a scroll indication refers to a user request to view a different portion of the reflowable file than is currently presented on the output medium. Receiving a scroll indication may be the result of, for example, a user pressing a button or key on or associated with a computing device, selecting a button or scroll bar presented as part of a user interface, swiping or otherwise manipulating a touchscreen, etc. In some embodiments, the scroll indication may relate to a request from the user to view the next or previous page, scroll up or down by one line, move to the next chapter, scroll pixel-by-pixel at a certain speed, jump to a specific reflow object or grouping in the reflowable file, etc.

At block 406, the reflowable file display module moves the location of the view window with respect to the image file based on the scroll indication. Whether data in the image file, the layout information, the reflowable file, or some combination thereof must be considered in determining the new location of the view window may depend on the type of scroll indication received. For example, if the scroll indication corresponds to a request to scroll pixel-by-pixel, the location of the view window may simply be adjusted up or down by a certain number of pixels in the image file based on the desired scroll amount. If the scroll indication corresponds to a request to view the next or previous page of content, the location of the view window may be adjusted up or down by approximately the vertical dimension of the view window. If the scroll indication corresponds to a request to view the next line of content, the reflowable file display module may either be moved to align the top of the view window with the next line than was previously aligned with the top of the view window, or alternatively be moved to align the bottom of the view window with the next line than was previously aligned with the bottom of the view window. Moving the location of the view window by line, in certain embodiments, may require the reflowable file display module to consider information from the layout information, such as the height of reflow objects on a line or coordinates of lines and/or reflow objects within a line.

In certain embodiments, the scroll indication may correspond to a user request to view reflow objects from the reflowable file for which layout information has not yet been determined and/or which have not yet been rendered to the image file. In this case, the new location of the view window may be determined after additional reflow objects have been rendered to the image file, as discussed further below, in a manner similar to that discussed at block 316 in reference to FIG. 3. In certain embodiments, if the scroll indication corresponds to a request to jump to a reflow object that is a considerable distance before or after the currently rendered reflow objects, the reflowable file display module may consider the current image data and/or layout information no longer useful, and may return to block 310 through block 318 of FIG. 3 to determine a new starting position, new layout information, etc., overwriting or discarding the previous image file data and/or layout information.

Referring again to FIG. 4, at decision block 408, the reflowable file display module determines whether the image file contains sufficient image data (i.e., rendered reflow objects) in the portion of the image file within the view window. In some embodiments, this decision may include determining whether the image file contains sufficient image data for a certain number of lines or pages after and/or before the new location of the view window. If the reflowable file display module determines that the image file contains sufficient image data, the method proceeds to block 416, in which the reflowable file display module sends the image data in the new location of the view window to the output medium for display. If instead the reflowable file display module determines that the image file does not contain sufficient image data, the reflowable file display module proceeds to decision block 410, in which the reflowable file display module determines whether the layout contains sufficient reflow data (i.e., layout information for reflow objects from the reflowable file). If the reflowable file display module determines that the layout contains sufficient layout information, the reflowable file display module proceeds to block 414, in which the reflowable file display module renders additional reflow objects to the image file based on the layout information. If instead the reflowable file display module determines that the layout does not contain sufficient layout information, the reflowable file display module proceeds to block 412, in which the reflowable file display module determines new layout information at block 412 prior to rendering reflow objects to the image file at block 414.

Determining new layout information at block 412 may require adjusting or overwriting the layout information previously determined for certain reflow objects. For example, if layout information was previously determined beginning in the middle of a group of reflow objects, such as a word in the middle of a paragraph, determining layout information for a scroll upwards in that paragraph may require reflowing the entire paragraph such that the start of the paragraph appears correctly spaced. In certain embodiments, such a reflow may require overwriting both a portion of the layout information and subsequently overwriting a portion of the image file with newly rendered reflow objects based on the new layout information. For example, such a reflowing may result in a reflow object that was previously the first reflow object on a line no longer appearing at the start of a line.

In certain embodiments, overwriting of layout information and/or the image file data may also occur for the purpose of removing less useful layout or image file data from memory. For example, the reflowable file display module may be configured to only keep a certain amount of layout information and/or image file data, and upon a movement of the view window, may discard or overwrite portions of the layout information and/or image file data corresponding to reflow objects which were least recently viewed, or are farthest from the current view window location. As discussed above, the data kept and data discarded or overwritten may also be based on maintaining a certain number of pages, lines, etc. before and/or after the current location of the view window. Thus, in certain embodiments, the reflow objects presented for display by the reflowable file display module may simulate the appearance to a user of one continuously scrollable or infinitely long image file that contains all reflow objects from the reflowable file, when in fact only a relatively small portion of the reflow objects are actually rendered in the image file at any point. Once the reflowable file display module has rendered reflow objects to the image file based on any new layout information, the method proceeds to block 416, in which the reflowable file display module sends the image data in the new location of the view window to the output medium for display. The method ends at block 420.

Figure 5:
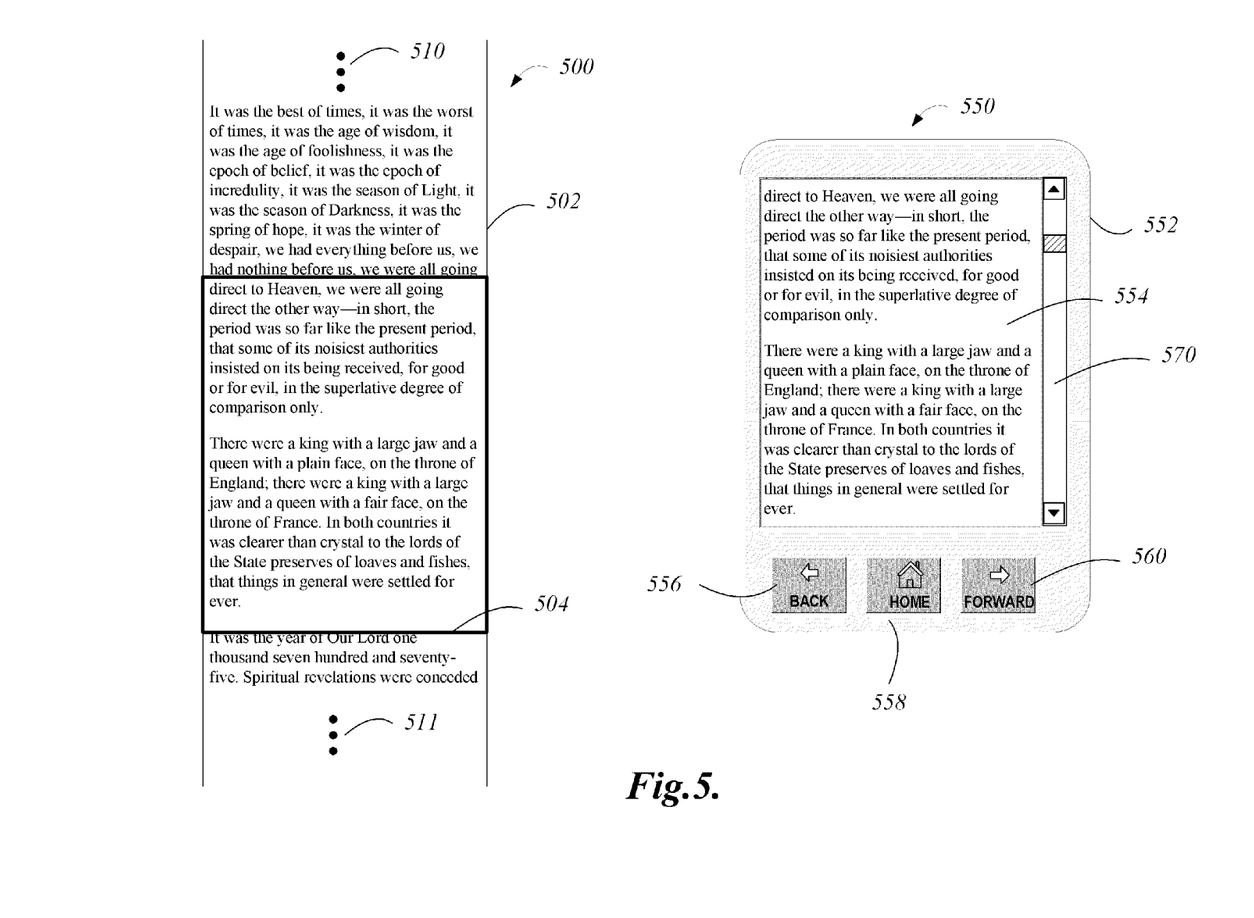
FIG. 5 is a pictorial view of content from a reflowable file being presented on a display of a computing device according to a view window logically superimposed upon an image file containing reflowed content.

FIG. 5 is a pictorial view of a viewer program displaying the content of a reflowable file on a display 554 of a computing device 552 according to a view window 504 logically superimposed upon an image file 502 containing reflowed content. Pictorial representation 500 illustrates an abstract view of an image file 502 which contains rendered reflow objects that correspond to text of a book. For example, each word shown in image file 502 may be a reflow object which has been rendered in the image file based on reflow object information from a reflowable file (not shown). Ellipses 510 and 511 are intended to abstractly represent that the image file contains additional rendered reflow objects both above and below the portion of the image file shown in pictorial representation 500. Pictorial representation 550 illustrates a portion of the image file 502 corresponding to the view window 504 presented on a display 554 of a computing device 552.

As illustrated, user selection of back button 556, home button 558 and forward button 560 on the computing device 552 may be used to send various scroll indications to the reflowable file display module in order to view different portions of the image file 502 on display 554 by moving the location of view window 504, as discussed above in reference to FIG. 4. For example, user selection of forward button 560 may correspond to a request to view the next page of reflow content. In response, the reflowable file display module may adjust the vertical location of the view window 504 relative to the image file 502 such that the view window 504 is moved further down the image file 502 by approximately the vertical dimension of the view window 504. If the image file 502 contains sufficient reflow object data in the portion corresponding to the view window 504, the reflowable file display module may then send the image data in the new location of the view window 504 to display 554 to be presented to the user. If the image file 502 does not contain sufficient reflow object data in the portion corresponding to view window 504, then the reflowable file display module may further render reflow objects to image file 502 prior to sending the image data in the new location of the view window 504 to display 554, as discussed above in reference to FIG. 4. As illustrated, a scroll bar 570 may be sent by the display module to display 554 to be presented to the user. In certain embodiments, portions of the scroll bar 570 may be selectable by the user, such that selection of a given portion of the scroll bar 570 may allow the user to request the next or previous page of reflow content, the next or previous line of reflow content, allow the user to jump to a given position in the reflowable file, and/or allow smooth pixel-by-pixel scrolling. In other embodiments, the scroll bar 570 may not be selectable by the user, but simply provide a visual indication of the relative position of the presently displayed reflow objects within the reflowable file.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for causing content to be presented on an output medium, the system comprising:
   a data store that stores a reflowable file, the reflowable file comprising one or more reflow objects of content, wherein the reflowable file includes at least one image, wherein each of the one or more reflow objects comprises a sub-image of the at least one image defined at least in part by a bounding region; and
   a computing device in communication with the data store and that is operative to:

determine a horizontal dimension and a vertical dimension of the output medium;

determine layout information, wherein the layout information identifies a layout of one or more reflow objects of content from at least a portion of the reflowable file in an image file, the image file representing the content as having a vertical dimension that exceeds the vertical dimension of the output medium and a horizontal dimension that approximates the horizontal dimension of the output medium;

render the one or more reflow objects of content from the at least a portion of the reflowable file to the image file according to the layout information;

cause a portion of the image file to be presented on the output medium, wherein the portion of the image file presented corresponds to a view window logically superimposed upon the image file, said view window having a vertical dimension approximate to the vertical dimension of the output medium and a horizontal dimension approximate to the horizontal dimension of the output medium;

receive a scroll indication for the content, the scroll indication corresponding to a request for display of additional content within the at least a portion of the reflowable file for which layout information has been determined; and adjust a location of the view window logically superimposed upon the image file based at least in part on the scroll indication, wherein the adjustment results in changing the portion of the image file presented on the output medium without rendering additional reflow objects of content to the image file.

2. The system of claim 1, wherein the layout information is determined based at least in part on the number of reflow objects that fit horizontally on each of a plurality of horizontal lines of the image file.

3. The system of claim 1, wherein the layout information comprises line data for a plurality of lines, the line data for each line comprising one or more reflow object identifiers, each reflow object identifier identifying a reflow object of content in the reflowable file.

4. A system for causing content to be presented on a display, the system comprising:

a data store that stores a reflowable file, the reflowable file comprising one or more reflow objects of content, wherein the reflowable file includes at least one image, wherein each of the one or more reflow objects comprises a sub-image of the at least one image; and a computing device in communication with the data store and that is operative to:

determine a horizontal dimension and a vertical dimension of the display;

determine layout information, wherein the layout information identifies a layout of one or more reflow objects of content from at least a portion of the reflowable file in an image file, the image file representing the content as having a vertical dimension that exceeds the vertical dimension of the display and a horizontal dimension that approximates the horizontal dimension of the display;

render the one or more reflow objects of content from the at least a portion of the reflowable file to the image file according to the layout information;

cause a portion of the image file to be presented on the display, wherein the portion of the image file presented corresponds to a view window logically superimposed upon the image file, said view window having a vertical dimension approximate to the vertical dimension of the display and a horizontal dimension approximate to the horizontal dimension of the display;

receive a scroll indication for the content, the scroll indication corresponding to a request for display of additional content within the at least a portion of the reflowable file for which layout information has been determined; and adjust a location of the view window logically superimposed upon the image file based at least in part on the scroll indication, wherein the adjustment results in changing the portion of the image file presented on the display without rendering additional reflow objects of content to the image file.

5. The system of claim 4, wherein the reflowable file is a document formatted as one of: Portable Document Format, electronic publication format, or an Open eBook publication format.

6. The system of claim 4, wherein each reflow object of content is defined in a bounding region.

7. The system of claim 4, wherein the computing device is further operative to:

determine a display zoom level; and resize the reflow objects of content according to the display zoom level prior to determining layout information for the resized reflow objects.

8. The system of claim 4, wherein the portion of the image file to display does not include portions of the image file that correspond to a line that is only partially within the view window.

9. The system of claim 4, wherein determining the vertical position at which to render a line of reflow objects in the image file is based at least in part on maintaining a minimum spacing between lines of reflow objects in the image file.

10. The system of claim 4, wherein determining the horizontal position at which to render a reflow object in the image file is based at least in part on maintaining a minimum horizontal spacing between reflow objects in the image file.

11. A computer-implemented method for causing content to be presented on an output medium, the computer-implemented method comprising:

as implemented by one or more computing devices configured with specific executable instructions, receiving a reflowable file corresponding to one or more reflow objects of content, wherein the reflowable file includes at least one image, wherein each of the one or more reflow objects comprises a sub-image of the at least one image;

determining a horizontal dimension and a vertical dimension of the output medium;

rendering one or more reflow objects of content from at least a portion of the reflowable file to an image file, the image file having a horizontal dimension less than or equal to the horizontal dimension of the output medium and a vertical dimension that exceeds the vertical dimension of the output medium;

causing a portion of the image file to be presented on the output medium, wherein the portion of the image file presented corresponds to a view window logically superimposed upon the image file, said view window having a vertical dimension less than or equal to the vertical dimension of the output medium and a horizontal dimension less than or equal to the horizontal dimension of the output medium;

receiving a request for content that is not within the view window, wherein the content associated with the request is within the at least a portion of the reflowable file; and adjusting a location of the view window logically superimposed upon the image file based at least in part on the request, wherein the adjustment results in changing the portion of the image file presented on the display without rendering additional reflow objects of content to the image file.

12. The computer-implemented method of claim 11, wherein the request corresponds to a request to view an additional line of reflow objects.

13. The computer-implemented method of claim 11, wherein the request corresponds to a request to view a next page of reflow objects, and wherein adjusting the location of the view window comprises changing a vertical location of the view window relative to the image file by approximately the vertical dimension of the view window.

14. The computer-implemented method of claim 11, wherein the request corresponds to a scroll request, and wherein adjusting the location of the view window comprises changing a vertical location of the view window relative to the image file by a predetermined number of pixels.

15. The computer-implemented method of claim 11, wherein each reflow object is rendered at a location in the image file that is determined based at least in part on the size of the reflow object.

16. A non-transitory computer-readable medium having a computer-executable component for causing content to be presented on a display, the computer-executable component comprising:

a viewing component that:
   determines a horizontal dimension and a vertical dimension of the display;
   renders one or more reflow objects of content from at least a portion of a reflowable file to an image file, the image file having a horizontal dimension that approximates the horizontal dimension of the display and a vertical dimension that exceeds the vertical dimension of the display, wherein the reflowable file includes at least one image, wherein each of the one or more reflow objects comprises a sub-image of the at least one image;
   causes a portion of the image file to be presented on the display, wherein the portion of the image file is defined by a view window associated with a location in the image file, the view window having a vertical dimension that approximates the vertical dimension of the display and a horizontal dimension that approximates the horizontal dimension of the display; and
   enables a user to adjust the location of the view window with respect to the image file, wherein an adjustment associated with a request to display content within the at least a portion of the reflowable file results in changing the portion of the image file presented on the display without rendering additional reflow objects of content to the image file.

17. The non-transitory computer-readable medium of claim 16, wherein the location of the view window with respect to the image file is adjusted in response to receiving a scroll indication.

18. The non-transitory computer-readable medium of claim 17, wherein the scroll indication corresponds to a request to view an additional line of reflow objects of content.

19. The non-transitory computer-readable medium of claim 17, wherein the scroll indication corresponds to a request to view a next page of reflow objects of content, and wherein adjusting the location of the view window comprises changing a vertical location of the view window with respect to the image file by approximately the vertical dimension of the view window.

* * * * *